(No Model.)
E. BRADLEY.
BUGGY COVER.
No. 304,604. Patented Sept. 2, 1884.
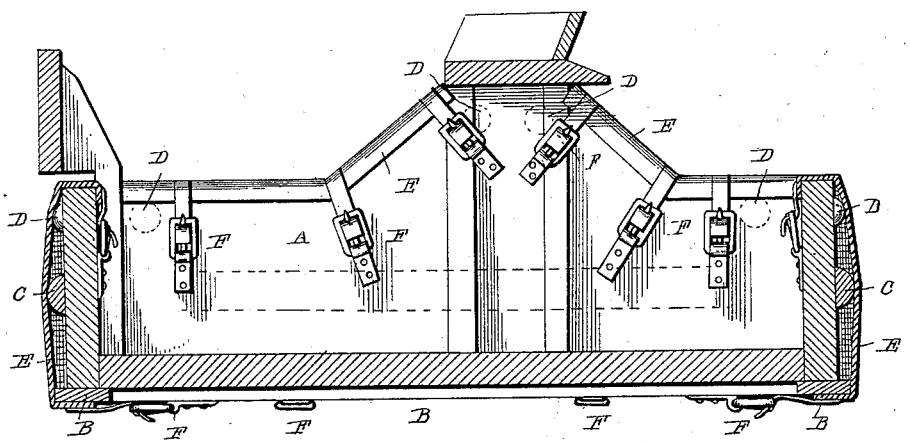
WITNESSES
INVENTOR

UNITED STATES PATENT OFFICE.

EVERAL BRADLEY, OF TRUMANSBURG, NEW YORK.

BUGGY-COVER.

SPECIFICATION forming part of Letters Patent No. 304,604, dated September 2, 1884.

Application filed April 3, 1884. (No model.)

*To all whom it may concern:*

Be it known that I, EVERAL BRADLEY, a citizen of the United States, residing at Trumansburg, in the county of Tompkins and State of New York, have invented certain new and useful Improvements in Buggy-Covers, of which the following is a specification, reference being had therein to the accompanying drawing.

My invention relates to removable covers for the boxes of buggies and other carriages, and is designed to protect them from mud and dirt. It is easily attached and can be quickly put on the box when a ride is taken on a muddy road or on a damp or rainy day. It protects the body from mud, and thereby obviates the scratching of the varnish incident to washing the said buggy. There being no mud or grit on the box, the polish is not dimmed nor the varnish scratched and tarnished, as stated.

In the drawing the figure represents a longitudinal section through a buggy-box, showing the cover attached.

A represents the ordinary buggy-body, which may or may not have attached to it a top.

B represents a strip or strips secured to the bottom of the box extending around it and projecting out from it, as shown. C represents strips secured to the box about midway of its height, and not extending quite to the corners. There may also be additional projections or buttons, as shown at D. Any or all these strips and projections may be dispensed with, their object being to prevent the cover from coming in contact with the box.

E represents a cover of any desired material, and preferably cut to fit the contour of the box. It is made to preferably lap over the edges of the said box, as shown. It is fastened by straps and buckles F, hooks and eyes, or any other device desired. The cover may be removed, rolled up, and stowed away in the buggy, ready for use, thus leaving the box clear.

Having thus described my device, what I claim is—

1. The combination, with a buggy or other carriage box, of a covering adapted to be removably secured to the same by buckles or other fastening device, as specified.

2. The combination, with a buggy-box having strips secured at its bottom, midway, or at the top, or any arrangement of the said strips, of a covering adapted to be secured to the said box to protect the same, and to be removed at pleasure, as and for the purpose specified.

In testimony whereof I affix my signature in presence of two witnesses.

EVERAL BRADLEY.

Witnesses:
  LEROY TREMBLY,
  SENECA SPICER.